Oct. 24, 1961   H. F. MASON   3,005,355
ROTARY MOTOR ACTUATED STEPPING DRIVE FOR ROTARY SWITCH
Filed June 6, 1960   2 Sheets-Sheet 1
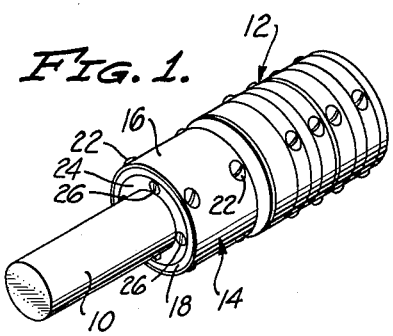
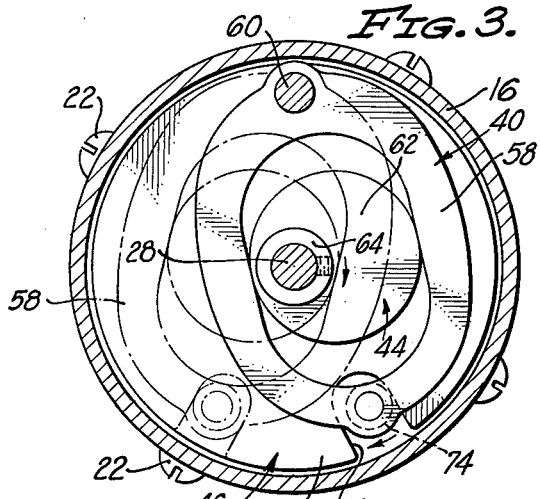
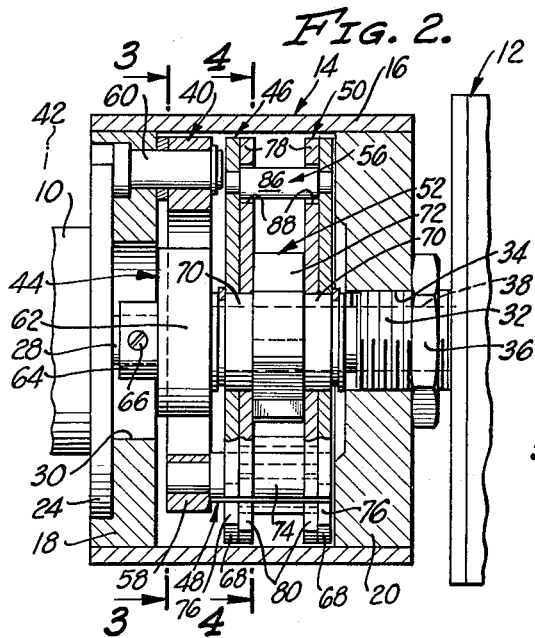
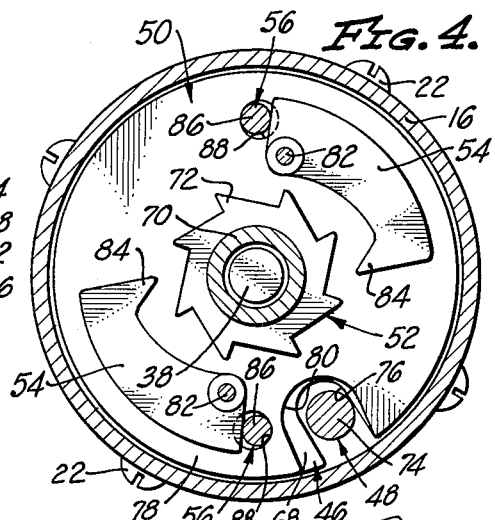
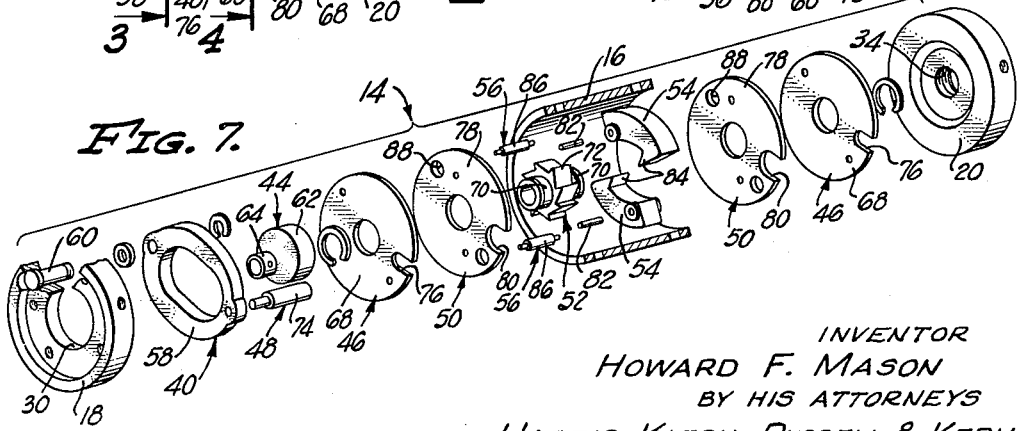
INVENTOR
HOWARD F. MASON
BY HIS ATTORNEYS
HARRIS, KIECH, RUSSELL & KERN Oct. 24, 1961  H. F. MASON  3,005,355
ROTARY MOTOR ACTUATED STEPPING DRIVE FOR ROTARY SWITCH
Filed June 6, 1960  2 Sheets-Sheet 2

INVENTOR
HOWARD F. MASON
BY HIS ATTORNEYS
HARRIS, KIECH, RUSSELL & KERN

United States Patent Office 3,005,355
Patented Oct. 24, 1961

3,005,355
ROTARY MOTOR ACTUATED STEPPING DRIVE
FOR ROTARY SWITCH
Howard F. Mason, Los Angeles, Calif., assignor to Mason
Electric Corporation, Los Angeles, Calif., a corporation of California
Filed June 6, 1960, Ser. No. 34,218
6 Claims. (Cl. 74—112)

The present invention relates to an apparatus for converting rotation of a driving member into step-by-step angular displacement of a driven member, which apparatus finds particular utility as a stepping driving connection between a rotary motor and a rotary switch, and which will, therefore, be considered in such regard herein for convenience.

More particularly, the present invention relates to an improved rotary-motor-actuated rotary-switch stepping drive which achieves results similar to those attained by the stepping drives of my co-pending patent application Serial No. 747,997, filed July 11, 1958, now Patent No. 2,952,750, issued September 13, 1960. As is the case with the stepping drive of my application Serial No. 747,997, the stepping drive of the present invention is of particular utility when utilized to drive rotary switches such as those disclosed in my Patents Nos. 2,831,073, 2,831,081 and 2,831,082, all issued April 15, 1958, and in my co-pending patent application Serial No. 710,796, filed January 23, 1958. To avoid unnecessary repetition, the disclosures of my aforementioned patents and co-pending applications are incorporated herein by reference.

Briefly, a rotary switch with which the stepping drive of the present invention is particularly useful comprises a notched, arcuate contact path, a contact carrier movable along the contact path, a roller contact rotatably mounted on the contact carrier and engaging the contact path and receivable in each of the recesses therein, an actuator rotatable about the axis of the contact path, means providing a resilient angular-lost-motion connection between the actuator and the contact carrier, resilient means engaging the actuator and the contact carrier for biasing the roller contact into engagement with the contact path, and kicking means carried by the actuator and engageable with the contact carrier for limiting the range of angular lost motion between the actuator and the contact carrier so as to kick the roller contact out of each of the recesses. With this construction, the energy stored in the resilient angular-lost-motion connection results in jumping of the roller contact from one recess to the next substantially independently of the actuator.

The present invention is adapted to be interposed between a rotary motor and the actuator of the rotary switch to provide a stepping driving connection between the motor and the rotary switch, the shaft of the motor, or a member connected thereto, becoming the driving or input member of the stepping driving connection and the actuator of the rotary switch, or a member connected thereto, becoming the driven or output member of the stepping driving connection.

As is the case with the stepping driving connections of my co-pending application Serial No. 747,997, the stepping driving connection of the present invention is an intermittent one, becoming disengaged after the roller contact has been kicked out of the recess in which it is disposed. The energy stored in the resilient angular-lost-motion connection of the rotary switch results in jumping of the roller contact from the recess out of which it has been kicked to the next substantially independently of the rotary motor, which means that the motor speed may be slow enough to provide reasonable control over coasting thereof in the event that stopping of the motor after jumping of the roller contact is desired. As will become apparent, the stepping driving connection of the present invention is engaged for one-half of each revolution of the motor, thereby making available one-half of each revolution of the motor for acceleration and deceleration thereof. This provides ample tolerances for starting and stopping so that no means for controlling coasting is necessary, particularly since the angular lost motion between the actuator and the contact carrier of the rotary switch permits considerable overrunning or underrunning of the motor without preventing the roller contact from reaching and remaining in the recess toward which it jumps.

With the foregoing general background in mind, a primary object of the present invention is to provide a stepping drive, for converting rotation of a driving member into step-by-step angular displacement of a driven member, which comprises a ratchet, one or more pawls and means for engaging the pawl or pawls with the ratchet throughout only a part of, and preferably one-half of, each revolution of the motor shaft, or other driving member.

More particularly, an important object of the invention is to provide a stepping driving connection which includes oscillatory means connectible to the motor shaft, or other driving member, and adapted to be oscillated thereby, a ratchet connectible to the rotary switch actuator, or other driven member, a pawl engageable with the ratchet in driving relation, means connecting the pawl to the oscillatory means for oscillatory movement therewith, and means for engaging the pawl with the ratchet in driving relation during movement of the oscillatory means in one direction.

Another and important object of the invention is to provide means responsive to movement of the pawl relative to the ratchet in one direction for engaging the pawl with the ratchet in driving relation. This construction eliminates any necessity for spring biasing the pawl into engagement with the ratchet, thereby providing a positive driving relation between the pawl and the ratchet and avoiding the problems associated with spring biased pawls, which are important features of the invention.

A more specific object of the invention is to provide a stepping driving connection which includes oscillatory driving means connectible to and adapted to be oscillated by the driving or input member, oscillatory driven means, a ratchet connectible to the driven or output member, a pawl mounted on the oscillatory driven means and movable relative thereto into and out of driving engagement with the ratchet, and means providing a lost-motion driving connection between the oscillatory driving means and the oscillatory driven means for moving the pawl into driving engagement with the ratchet automatically in response to movement of the oscillatory driving means in one direction.

Still another object is to provide a construction wherein the means last defined in the preceding paragraph includes a pawl driving element carried by the oscillatory driving means and engageable with the pawl in response to movement of the oscillatory driving means in one direction and engageable with the oscillatory driven means in response to movement of the oscillatory driving means in the opposite direction.

The foregoing objects, advantages, features and results of the present invention, together with various other objects, advantages, features and results thereof which will be evident to those skilled in the art to which the invention relates in the light of this disclosure, may be attained with the exemplary embodiments of the invention described in detail hereinafter and illustrated in the accompanying drawings, in which:

FIG. 1 is a perspective view on a reduced scale of a rotary motor and rotary switch combination which incorporates the stepping driving connection of the invention;

FIG. 2 is a longitudinal sectional view of the stepping driving connection or stepping drive of the invention;

FIG. 3 is a transverse sectional view taken along the arrowed line 3—3 of FIG. 2;

FIGS. 4, 5 and 6 are transverse sectional views taken along the arrowed line 4—4 of FIG. 2 and illustrating successive operating positions of various components of the stepping drive;

FIG. 7 is an exploded perspective view of the stepping drive on a reduced scale.

Figure 5:
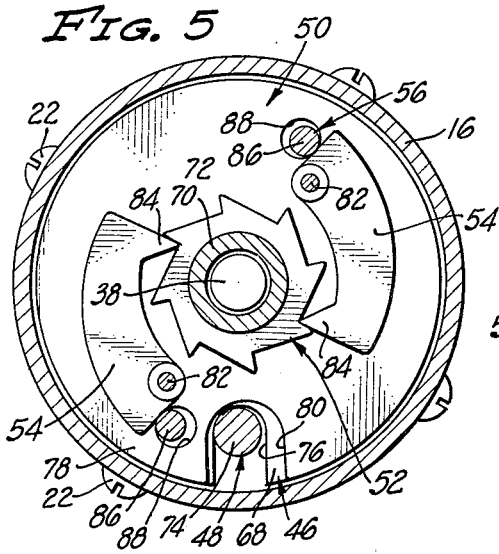

Referring first to FIG. 1 of the drawings, the numeral 10 designates a rotary electric motor which drives a series 12 of interconnected rotary switches through a stepping driving connection or stepping drive 14 of the invention. In the particular construction illustrated, the motor 10, the switch series 12 and the stepping drive 14 are all coaxial. However, this is not essential to the present invention. For example, the motor 10 could be located alongside and parallel to the switch series 12. Alternatively, the motor 10 could be coaxial and within the series 12 of rotary switches.

As best shown in FIGS. 2 and 7, the stepping drive 14 includes a tubular housing 16 having closures 18 and 20 in its respective ends. The end closures 18 and 20 are secured in place in the ends of the tubular housing 16 in any suitable manner, as by screws 22.

The housing of the rotary motor 10 terminates at one end in an annular flange 24 which is seated in a central recess in the outer end of the end closure 18 and which is suitably secured to such end closure, as by screws 26, FIG. 1. The motor 10 includes a shaft 28 which projects through the flange 24 into a central opening 30 through the end closure 18. The motor shaft 28 constitutes a driving or input member for the stepping drive 14 and will frequently be referred to as such hereinafter.

As shown in FIG. 2, the first rotary switch of the series 12 is provided with a central boss 32 which is threaded into a central opening 34 in the end closure 20 and secured by a lock nut 36. The rotary switch series 12 includes an actuator shaft 38 which extends through the boss 32 and into the space between the end closures 18 and 20. For example, the boss 32 and the actuator shaft 38 may correspond to the boss 86 and the actuator shaft 136, respectively, of the rotary switch illustrated in FIG. 5 of my co-pending application Serial No. 710,796. The actuator shaft 38 constitutes a driven or output member of the stepping drive 14 and will frequently be referred to as such hereinafter.

It will be noted that the driving and driven members 28 and 38 of the stepping drive 14 are coaxial. The common axis of these members will sometimes be referred to hereinafter as the main axis of the stepping drive 14.

Considering the general components of the stepping drive 14, they comprise: an oscillatory driving structure 40 oscillatable about an auxiliary axis 42 spaced from and parallel to the main axis of the drive 14; cam means 44 connected to the driving member 28 for oscillating the driving structure 40 about the auxiliary axis 42; an oscillatory follower structure 46 oscillatable about the main axis; means 48 coupling the follower structure 46 to the driving structure 40 for oscillating the follower structure about the main axis in response to oscillatory movement of the driving structure about the auxiliary axis 42; an oscillatory driven structure 50 oscillatable about the main axis; a ratchet 52 connected to the driven member 28; pawls 54 pivotally mounted on the driven structure 50 at points spaced from the main axis and pivotable relative to the driven structure into and out of driving engagement with the ratchet 52; and pawl driving means 56 providing a lost-motion driving connection between the follower structure 46 and the driven structure 50 for oscillating the driven structure about the main axis in response to oscillatory movement of the follower structure thereabout and for moving the pawls 54 into driving engagement with the ratchet 52 in response to movement of the follower structure 46 about the main axis in one direction. The foregoing general components of the stepping drive 14 will now be considered in more detail substantially in the order presented.

The driving structure 40 comprises a slotted cam follower 58 pivotally mounted at one end on a pivot pin 60 which is mounted on the end closure 18 and the axis of which coincides with the auxiliary axis 42. The pivot pin 60 is headed externally of the end closure 18 and projects longitudinally therethrough into the space between the end closures 18 and 20, the motor flange 24 acting as a retainer preventing longitudinal outward movement of the pivot pin.

The cam means 44 comprises a circular cam 62 disposed within the slot of the slotted cam follower 58. The cam 62 is provided with an eccentric hub 64 which is telescoped over the shaft forming the driving member 28 and which is suitably secured thereto, as by a set screw 66.

The follower structure 46 comprises two axially spaced follower discs 68 respectively journaled on hubs 70 provided by the ratchet 52 on opposite sides of ratchet teeth 72 thereon, the ratchet being telescoped over and suitably keyed to the shaft forming the driven member 38.

The coupling means 48 between the driving structure 40 and the follower structure 46 comprises a coupling pin 74 mounted on the end of the slotted cam follower 58 opposite the end thereof which is mounted on the pivot pin 60. The coupling pin 74 extends longitudinally of the stepping drive 14 into notches 76 in the follower discs 68.

With the foregoing construction, each revolution of the driving member 28 rotates the cam 62 through one revolution to oscillate the cam follower 58 back and forth about the auxiliary axis 42 through one cycle. The coupling pin 74, in turn, oscillates the follower structure 46 back and forth about the main axis through one cycle.

The driven structure 50 comprises two driven discs 78 respectively journaled on the ratchet hubs 70 on opposite sides of the ratchet teeth 72, the driven discs 78 being disposed between the follower discs 68. The driven discs 78 are provided therein with peripheral notches 80 which register with the peripheral notches 76 in the follower discs 68 and through which the coupling pin 74 extends to permit the coupling pin to engage the edges of the notches 76 in both follower discs 78. However, the coupling pin 74 does not drivingly engage the edges of the notches 80 in the driven discs 78 at any time. The notches 80 are merely present to permit the coupling pin 74 to engage both of the follower discs 68 and are sufficiently wider, in the circumferential direction, to prevent driving engagement of the coupling pin with the edges thereof.

The pawls 54 are disposed between the driven discs 78 and are pivotally mounted thereon by pins 82 which extend longitudinally through the driven discs and the respective pawls at points spaced radially outwardly from the main axis of the stepping drive 14. Each pawl pivot pin 82 extends through the corresponding pawl 54 adjacent the inner periphery of such pawl and adjacent one end thereof, each pawl being provided adjacent its other end with a pawl tooth 84 engageable with one of the ratchet teeth 72. As will be clear from FIGS. 4, 5 and 6 of the drawings, the pawls 54 are pivotable inwardly and outwardly about the pivot pins 82 to move the pawl teeth 84 into and out of driving engagement with the ratchet teeth 72.

Figure 6:
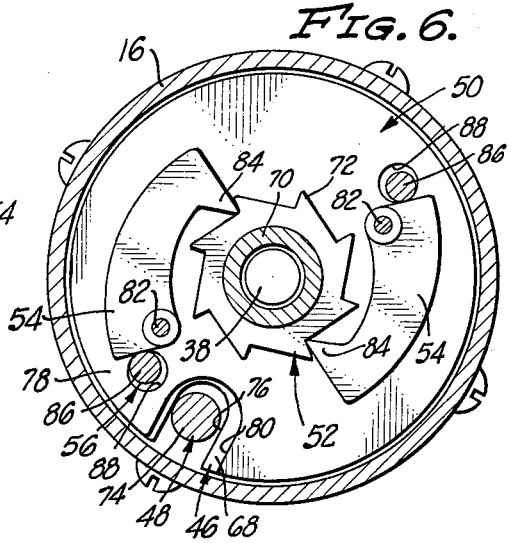

The pawl driving means 56 comprises two pawl driving elements or pins 86 which are mounted on the follower discs 68 and which extend longitudinally through enlarged holes 88 in the driven discs 78. The pawl driving pins 86 are located adjacent the pivoted ends of the pawls 54 and are located radially outwardly of the pawl pivot pins 82. As shown in FIGS. 4, 5 and 6, the pawl driving pins 86 are selectively engageable with the edges of the holes 88 in the driven discs 78 and with the pivoted ends of the pawls 54 at points radially outwardly from the pawl pivot pins 82.

OPERATION OF STEPPING DRIVE 14

As previously explained, each revolution of the driving member 28 produces one revolution of the cam 62 to swing the cam follower 58 back and forth through one cycle about the auxiliary axis 42. The range of travel of the cam follower 58 is shown in FIG. 3 of the drawings. The coupling pin 74 simultaneously oscillates the follower discs 68 back and forth about the main axis through one cycle, the range of travel of the follower discs also being shown in FIG. 3 of the drawings, and being further shown in FIGS. 4, 5 and 6 thereof.

During movement of the follower discs 68 in the clockwise direction, as viewed in FIGS. 4, 5 and 6, the pawl driving pins 86 first pivot the pawls 54 inwardly into driving engagement with the ratchet 52, as best shown in FIG. 5. As soon as the pawls 54 drivingly engage the ratchet 52, continued clockwise rotation of the pawl driving pins results in clockwise rotation of both the ratchet 52, to rotate the driving member 38, and of the driven discs 78. All of the foregoing occurs during movement of the cam follower 58 in one direction, and thus occurs during one-half of a revolution of the driving member 28.

During the following one-half revolution of the driving member 28, the cam follower 58 is moved in the opposite direction and, through the coupling pin 74, moves the follower discs 68 in the opposite direction, i.e., in the counterclockwise direction as viewed in FIGS. 4 to 6. When this occurs, the pawl driving pins 86 first move away from the pivoted ends of the pawls 54 to release the pawls from their driving engagement with the ratchet 52. Upon continued counterclockwise rotation of the follower discs 68, the pawl driving pins 86 engage the edges of the holes 88 farthest from the pivoted ends of the pawls 54 to rotate the driven discs 78 in the counterclockwise direction. This continues until the various parts have been restored to their original positions.

The throw of the cam follower 58 about the auxiliary axis 42 is sufficiently great that the pawl teeth 84 engage successive ratchet teeth 72 during successive oscillations of the cam follower 58. Thus, for each revolution of the driving member 28, the driven member 38 is angularly advanced or stepped a distance equal to the spacing of the ratchet teeth 72. Stepping of the driven member 38 takes place during only one-half of each revolution of the driving member 28, the other one-half of each revolution of the driving member 28 being devoted to reversing the direction of movement of the pawls 54 to enable them to move into positions wherein they can engage ratchet teeth spaced unitary increments from those previously engaged.

An important feature of the invention is that the pawls 54 are positively pivoted into driving relation with the ratchet 52 by the pawl driving pins 86, thereby eliminating any necessity for spring biasing the pawls into engagement with the ratchet and avoiding problems frequently associated with spring biased pawls. The pawl driving pins 86 provide a very positive driving relation between the pawls 54 and the ratchet 52 during stepping of the driven member 38, but impose no engaging forces on the pawls during reversed movement thereof. This minimizes wear of the ratchet and pawl teeth 72 and 84.

Because of the fact that only one-half of each revolution of the driving member 28 is used to produce each step of the driven member 38, the other one-half of each revolution of the driving member is available for starting and stopping the motor 10, assuming that starting and stopping of the motor between successive steps of the driven member 38 is desired, which is the case in many instances. (Actually, somewhat less than one-half of each revolution of the driving member 28 is utilized to advance the driven member 38 and, therefore, somewhat over one-half of each revolution of the driving member 28 is available for starting and stopping of the motor 10, because of lost motion in the stepping drive 14, such lost motion being due to such things as the lost-motion connection between the driven structure 50 and the follower structure 46 provided by the loose fits of the pawl driving pins 86 in the holes 88 in the driven discs 78, the lost motion between the pawls 54 and the ratchet 52, and the like.) Thus, accurate stepping of the driven member 38 is possible with the stepping drive 14 of the invention.

As previously pointed out, the stepping drive 14 has particular utility in driving one or more rotary switches having the characteristics disclosed in my aforementioned patents and co-pending applications, which switches utilize stored energy to jump from one position to the next. Thus, when the stepping drive 14 is utilized to drive such a rotary switch, the roller contact, or roller contacts, of the rotary switch are kicked out of the recesses in which they are disposed during the interval that the driven member 38 is advanced one step by the ratchet 52 and the pawls 54. Thereafter, the roller contact, or the roller contacts, of the rotary switch jump to the next recesses substantially independently of the rotary motor 10. Consequently, the motor speed may be slow enough to provide reasonable control over coasting thereof in the event that stopping of the motor after jumping of the roller contact, or roller contacts, is desired, there being, as previously pointed out, at least one-half of each revolution of the driving member 28 available for starting and stopping of the motor. Also, a rotary switch of the nature under consideration has angular lost motion therein which must be taken up before jumping of the roller contact or contacts can occur. The angular lost motion in the stepping drive 14 and the angular lost motion in the rotary switch or switches permit considerable overrunning or underrunning of the motor 10 without preventing the roller contact or contacts from reaching and remaining in the recesses toward which they jump, if it is desired to stop the motor after each step, or after a particular step.

Figure 8:
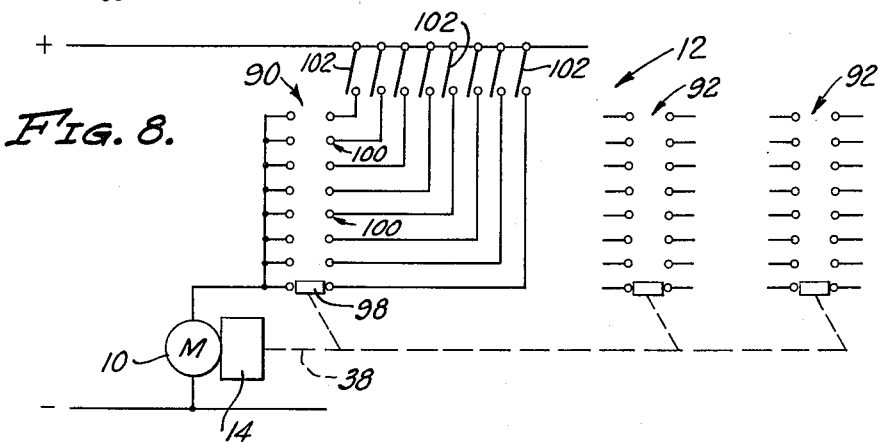
FIGS. 8 and 9 are diagrammatic views illustrative of possible circuits with which a rotary motor, rotary switches and the stepping drive of the invention may be utilized.
Figure 9:
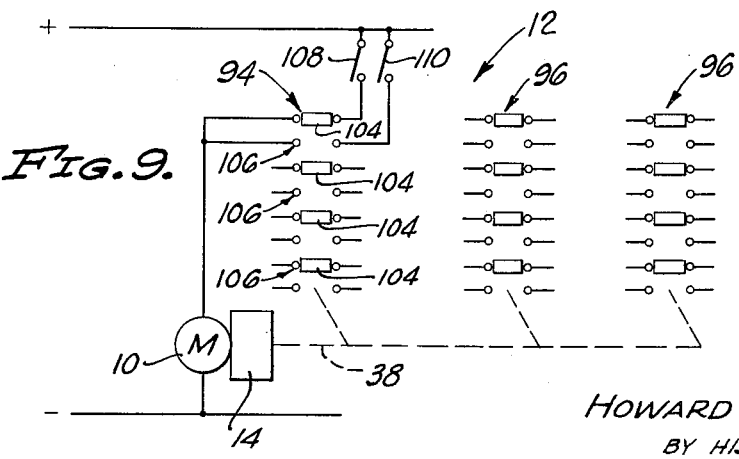

Referring now to FIGS. 8 and 9 of the drawings, the stepping drive 14 of the invention is illustrated diagrammatically therein as having its input side connected to the rotary motor 10 and as having its output or driven member 38 gang connected to a control rotary switch and two programming rotary switches. In FIG. 8, the control switch is indicated generally by the numeral 90 and the programming switches are indicated generally by the numeral 92. In FIG. 9, the control switch is indicated generally by the numeral 94 and the programming switches are indicated generally by the numeral 96. Preferably, the control and programming switches 90, 92, 94 and 96 have characteristics similar to the switches disclosed in my aforementioned patents and co-pending applications. Only the relationships of the control switches 90 and 94 to the rotary motor 10 and the stepping drive 14 will be considered hereinafter. The programming switches 92 and 96 may be connected to any desired external circuits and will not be considered further.

Considering FIG. 8 in more detail, the control switch 90 is provided with a roller contact 98 driven by the stepping drive 14 and adapted to successively bridge the contacts of a series of stationary contact pairs 100. As explained in my aforementioned patent and co-pending applications, the stationary contact pairs 100 are circumferentially arranged along a circumferential contact path having notches therein for the roller contact 98 at the respective stationary contact pairs. The stationary contact pairs 100 are connected in series with the rotary motor 10 and are respectively connected in series with regulating switches 102.

With the control circuit for the rotary motor 10 shown in FIG. 8 of the drawings, the motor is energized as long as the roller contact 98 is in engagement with a stationary contact pair 100 which is in series with a closed regulating switch 102. Thus, the motor 10 acts through the stepping drive 14 of the invention to advance the roller contact 98 from one stationary contact pair 100 to the next until such time as an open regulating switch 102 is located, whereupon the motor 10 is deenergized until such time as the regulating switch in question is closed. Thus, the control circuit of FIG. 8 of the drawings provides an open circuit hunter, such an apparatus being disclosed in more detail in my co-pending patent application Serial No. 712,785, filed February 3, 1958, now Patent No. 2,945,969, issued July 19, 1960, the disclosure of which is incorporated herein by reference.

Turning to FIG. 9 of the drawings, the control switch 94 includes a plurality of circumferentially spaced roller contacts 104 and a number of stationary contact pairs 106, double the number of roller contacts, the roller contact spacing being double that of the stationary contact pairs. Two adjacent ones of the stationary contact pairs 106 are connected in series with the rotary motor 10 and respectively connected in series with regulating switches 108 and 110. As will be apparent, if the regulating switch 108 is closed, the rotary motor 10 will be energized to cause the stepping drive 14 to advance the roller contacts 104 one step. If the regulating switch 110 is open, the rotary motor 10 is deenergized. Consequently, all motion stops. If the regulating switch 110 is subsequently closed and the regulating switch 108 is opened, the roller contacts 104 move forward another step, and all motion again ceases. Under these conditions, assuming that there are four of the roller contacts 104 as shown, the fourth one of the roller contacts has now taken the place of the first one, and the first one has taken the position originally held by the second one. Consequently, although the control switch 94 has moved forwardly in the mechanical sense, it has moved rearwardly insofar as its electrical functions are concerned. In other words, although the control switch 94 rotates unidirectionally in a mechanical sense, the effect in an electrical sense is one of forward and rearward motion. Such an arrangement has many potential uses, one being that a single device can replace two or more latching relays.

The stepping drive 14 of the invention can be utilized in many other circuit arrangements, those illustrated in FIGS. 8 and 9 of the drawings and described above being exemplary only. Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In combination: a unidirectionally movable ratchet; a bidirectionally movable pawl engageable with said ratchet in driving relation during movement of said pawl in one direction; a bidirectionally movable structure; and pawl driving means acting on said pawl, and responsive to movement of said bidirectionally movable structure in said one direction, for moving said pawl in said one direction and for engaging said pawl with said ratchet in driving relation.

2. In an apparatus for converting rotation of a driving member into step-by-step angular displacement of a driven member, the combination of: oscillatory means; means connectible to the driving member for oscillating said oscillatory means; a ratchet connectible to the driven member; a pawl engageable with said ratchet in driving relation; means connecting said pawl to said oscillatory means for oscillatory movement therewith; and pawl driving means acting on said pawl for engaging said pawl with said ratchet in driving relation during movement of said oscillatory means in one direction.

3. In an apparatus for converting unidirectional rotation of a driving member into step-by-step unidirectional angular displacement of a driven member, the combination of: oscillatory driving means; means connectible to the driving member for oscillating said oscillatory driving means; oscillatory driven means; a ratchet connectible to the driven member; a pawl mounted on said oscillatory driven means and movable relative thereto into and out of driving engagement with said ratchet; and means providing a lost-motion driving connection between said oscillatory driving means and said oscillatory driven means for oscillating said oscillatory driven means and for moving said pawl into driving engagement with said ratchet in response to movement of said oscillatory driving means in one direction.

4. In an apparatus for converting unidirectional rotation of a driving member into step-by-step unidirectional angular displacement of a driven member, the combination of: oscillatory driving means; rotatable means connectible to the driving member for oscillating said oscillatory driving means; oscillatory driven means; a ratchet connectible to the driven member; a pawl mounted on said oscillatory driven means and movable relative thereto into and out of driving engagement with said ratchet; and means providing a lost-motion driving connection between said oscillatory driving means and said oscillatory driven means for oscillating said oscillatory driven means and for moving said pawl into driving engagement with said ratchet in response to movement of said oscillatory driving means in one direction, including a pawl driving element carried by said oscillatory driving means and engageable with said pawl in response to movement of said oscillatory driving means in said one direction and engageable with said oscillatory driven means in response to movement of said oscillatory driving means in the opposite direction.

5. An apparatus for converting unidirectional rotation of a driving member into step-by-step unidirectional angular displacement of a driven member, said apparatus providing spaced, parallel main and auxiliary axes, and including: an oscillatory driving structure oscillatable about said auxiliary axis; means rotatable about said main axis and connectible to the driving member for oscillating said oscillatory driving structure about said auxiliary axis; an oscillatory follower structure oscillatable about said main axis; means coupling said oscillatory follower structure to said oscillatory driving structure for oscillating said oscillatory follower structure about said main axis in response to oscillatory movement of said oscillatory driving structure about said auxiliary axis; an oscillatory driven structure oscillatable about said main axis; a ratchet rotatable about said main axis and connectible to the driven member; a pawl mounted on said oscillatory driven structure and movable relative thereto into and out of driving engagement with said ratchet; and means providing a lost-motion driving connection between said oscillatory follower structure and said oscillatory driven structure for oscillating said oscillatory driven structure about said main axis in response to oscillatory movement of said oscillatory follower structure thereabout and for moving said pawl into driving engagement with said ratchet in response to movement of said oscillatory follower structure about said main axis in one direction.

6. An apparatus for converting unidirectional rotation of a driving member into step-by-step unidirectional angular displacement of a driven member, said apparatus providing spaced, parallel main and auxiliary axes, and including: an oscillatory cam follower oscillatable about said auxiliary axis; means comprising a cam rotatable about said main axis and connectible to the driving member for oscillating said oscillatory cam follower about said auxiliary axis; an oscillatory follower structure oscillatable about said main axis; means coupling said oscillatory follower structure to said oscillatory cam follower for oscillating said oscillatory follower structure about said main axis in response to oscillatory movement of said oscillatory cam follower about said auxiliary axis; an oscillatory driven structure oscillatable about said main axis; a ratchet rotatable about said main axis and connectible to the driven member, a pawl mounted on said oscillatory driven structure and movable relative thereto into and out of driving engagement with said ratchet; and means providing a lost-motion driving connection between said oscillatory follower structure and said oscillatory driven structure for oscillating said oscillatory driven structure about said main axis in response to oscillatory movement of said oscillatory follower structure thereabout and for moving said pawl into driving engagement with said ratchet in response to movement of said oscillatory follower structure about said main axis in one direction, including a pawl driving element carried by said oscillatory follower structure and engageable with said pawl in response to movement of said oscillatory follower structure in said one direction and engageable with said oscillatory driven structure in response to movement of said oscillatory follower structure in the opposite direction.

References Cited in the file of this patent

UNITED STATES PATENTS

| | | |
|---|---|---|
| 2,758,481 | Mouravieff | Aug. 14, 1956 |
| 2,859,631 | Spahr | Nov. 11, 1958 |

FOREIGN PATENTS

| | | |
|---|---|---|
| 468,183 | Germany | Nov. 8, 1928 |